United States Patent

Harness

Patent Number: 5,411,321
Date of Patent: May 2, 1995

[54] TOWED VEHICLE BRAKE CONTROL

[76] Inventor: Harry N. Harness, R.R. 2, Holly Isles, Donalsonville, Ga. 31745

[21] Appl. No.: 57,375

[22] Filed: May 6, 1993

[51] Int. Cl.6 .......................... G05G 15/00; B60T 7/00
[52] U.S. Cl. .......................................... 303/7; 188/34; 188/112 R; 74/512; 74/532
[58] Field of Search ................ 303/7, 49, 9.61, 15–17, 303/20, 89; 188/3 H, 151 A, 265, 353, 352, 3 R; 74/532, 512; 254/DIG. 5; 180/167

[56] References Cited

U.S. PATENT DOCUMENTS

| | | | |
|---|---|---|---|
| 2,177,469 | 10/1939 | White | 303/7 |
| 2,711,228 | 6/1955 | Shank | 303/7 |
| 2,800,980 | 7/1957 | Flockhart | 303/15 |
| 3,034,598 | 5/1962 | LaFaye | 303/20 X |
| 3,048,976 | 8/1962 | Grigsby et al. | 303/20 X |
| 3,350,142 | 10/1967 | Schuman | 303/20 X |
| 3,583,771 | 6/1971 | Dressler, Jr. | 303/20 |
| 3,796,468 | 3/1974 | Morse et al. | 303/15 |
| 5,031,729 | 7/1991 | Wittkop et al. | 188/3 H |

FOREIGN PATENT DOCUMENTS 085048  5/1985  Japan ................................ 188/265

Primary Examiner—Josie A. Ballato
Attorney, Agent, or Firm—Arthur G. Yeager

[57] ABSTRACT

System for selectively applying the brakes of a towed vehicle by controls in the towing vehicle; the system including a portable air compressor and a pneumatic cylinder that can be rapidly installed by attaching to a support structure on the floor of the driver's cockpit in the towed vehicle; the piston of the cylinder being attached to the brake pedal; and a three-way solenoid valve to permit or not to permit the admission of compressed air to the cylinder.

18 Claims, 3 Drawing Sheets

5,411,321

TOWED VEHICLE BRAKE CONTROL

BACKGROUND OF THE INVENTION

Modern highways are frequently traversed by motor homes towing an automobile which is easily detached from the motor home when it is parked, and then can be used to travel to any place the driver wishes. Generally, such motor homes and their towed automobiles must rely upon the brakes of the motor home to slow or stop tandem vehicles. This is a dangerous arrangement because it rapidly wears down the brakes of the motor home. There is no convenient means on the market today to install a brake system in the towed automobile and make it controllable by the driver of the motor home. There are systems now used on freight trucks and trailers to apply separately the brakes of the towing vehicle and the towed vehicle, but these are apparently only available for vehicles having brake systems using compressed air as the force to apply the brakes of the towed vehicle; i.e., the brakes are air brakes. Systems of this type are disclosed in U.S. Pat. Nos. 2,800,980; 3,583,771 and 3,796,468. Ordinary automobiles, however, have hydraulic brakes.

Two prior art patents disclose systems that are designed to function with motor homes towing an automobile. U.S. Pat. No. 2,177,469 discloses a system in which the driver of the towing vehicle actuates a vacuum system in the towed vehicle to push a rod against the brake pedal of the towed vehicle. This system is not simple and could not be installed by the ordinary driver having no specialized experience as a car mechanic. U.S. Pat. No. 2,711,228 discloses a hydraulic system for depressing the brake pedal of the towed vehicle by the driver of the towing vehicle, but it requires a hydraulic line to be suspended between the vehicles, and, therefore, is subject to accidental loss of pressure, and may unintentionally permit the entrance of air into the system when being connected or disconnected.

It is an object of this invention to provide a system for selectively operating the brakes of a towed vehicle by operation of the driver of the towing vehicle. It is another object of this invention to provide such a system made from readily available components and easily installed in a vehicle without professional assistance. Still other objects will become apparent from the detailed description which follows.

BRIEF SUMMARY OF THE INVENTION

This invention relates to a system for actuating the brakes of a towed vehicle by electric signal from the towing vehicle, which comprises a pneumatic cylinder with a movable piston and a piston rod connected directly to the brake pedal of the towed vehicle and adapted to depress the brake pedal when pneumatic pressure is applied to the piston; a portable air compressor removably installable in the towed vehicle and manually connectible via conduits to the cylinder; a solenoid valve means adapted to selectively permit compressed air from the compressor to be applied to the cylinder or to discharge the compressed air to the surrounding atmosphere; an adjustable relief valve to automatically relieve the development of higher pressures by the compressor than selected; and electric switch means in the towing vehicle to activate the compressor and the solenoid valve means.

In specific and preferred embodiments of the invention the compressor and the solenoid valve are energized by the battery of the towed vehicle, preferably by connection through a cigarette lighter switch in the towed vehicle. The solenoid valve is employed to permit or not permit the compressed air to move the piston in the pneumatic cylinder. Other preferred embodiments are directed to the means for mounting the compressor, cylinder, and solenoid valve in front of the brake pedal of the towed vehicle so as to be easily placed into or out of operating arrangement.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The various features and advantages of the invention are best understood by reference to the attached drawings.

Figure 1:
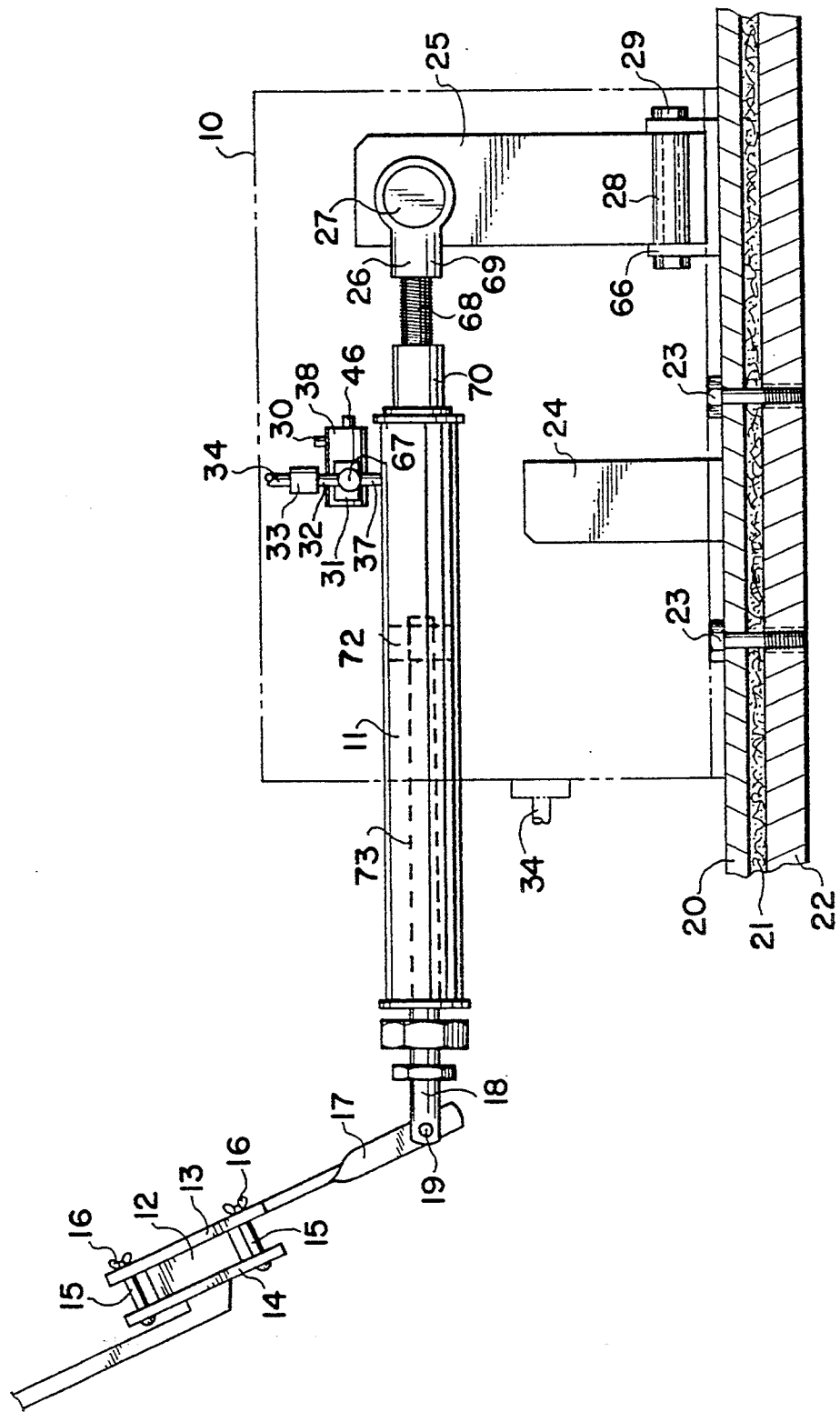
FIG. 1 is a schematic side elevational view, partly in cross-section, of the system of this invention.
Figure 2:
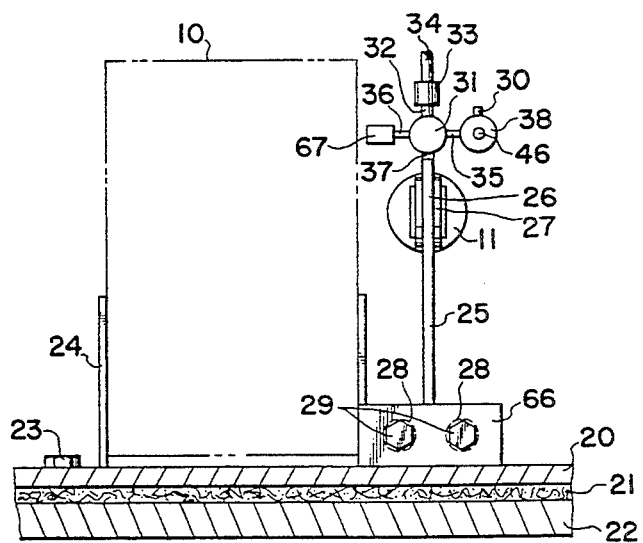
FIG. 2 is a schematic end elevational view of the system of this invention shown in FIG. 1.

In FIGS. 1-2 there is shown a portable air compressor 10 such as those presently available on the market to be powered by an automobile battery by a plug connector inserted into the cigarette lighter of the automobile. Such compressors weigh about 5-6 lbs. and can develop air pressure up to about 220 psi. Their internal components and arrangement are unimportant to this invention and, therefore, are not shown in the drawings nor described in detail in this description, since any such air compressor is suitable for this invention. Compressor 10 has an outlet flexible conduit 34 which is connected to cylinder 11 through a snap-fit coupling and through 4-way manifold 31. Inside cylinder 11 is a piston 72 and piston rod 73. The snap-fit coupling sometimes referred to as a "quick chuck" connector, includes a male portion 32 on manifold 31 and a female portion 33 on conduit 34. Manifold 31 is connected through line 37 to cylinder 11; through line 35 to solenoid 38; and through line 36 to pressure relief valve 67, which can be manually set to any desired pressure. Solenoid valve 38 is a 3-way valve. One port is connected to manifold 31 through line 35 but this port is closed when solenoid valve 38 is not energized. A second port 46 is an exhaust port opening to the atmosphere and third port 30 is permanently closed by a screw or bolt or other type of plug. When solenoid 38 is not energized, exhaust port 46 to the atmosphere is open thus preventing any build-up of compressed air to move the piston in cylinder 11. When solenoid 38 is energized, exhaust port 46 is closed and compressed air from the compressor is admitted to cylinder 11 causing the piston and piston rod to move from right to left in FIG. 1.

Extension arm 18 is connected to the piston rod and moves right and left as the piston rod is moved right and left as viewed in FIG. 1. Extension arm 18 is pivotally connected to lever arm 17 through pivot pin 19, which is adjustable and also clampable to a rigid position. Arm 17 is an extension of top clamp portion 13 which, together with bottom clamp portion 14, clamps onto brake pedal 12 of the towed vehicle. Clamp portions 13 and 14 are secured by bolts 15 and wing nuts 16. Other clamping arrangements are operable and within the scope of this invention.

Compressor 10 and cylinder 11 are rigidly attached to support structure principally comprising horizontal floor plate 20 and vertical plate 25 which are connected to each other through double hinge tubes 28, hinge pins 29, and U-bracket 66. Tubes 28 are welded to vertical plate 25. U-bracket 66 is welded to horizontal floor plate 20. Pins 29 are separately removable from tubes 28. This double hinge arrangement permits either or both of pins 29 to be removed from tubes 28 to allow plate 25 to be pivoted in either direction to lie flat on the floor of the towed vehicle, if one pin 29 is removed; or to be removed completely, if both pins 29 are removed. Compressor container 10 is attached to plate 20 by resting in saddle member 24. Whenever desirable, container 10 may be removed from saddle member 24, e.g., when it is desired to drive the towed vehicle separated from the towing vehicle. The rearward end of cylinder 11 is attached to vertical plate 25 by means of yoke 26 and pin 27 which provides some vertical pivoting of cylinder 11. Lengthwise extension adjustment of cylinder 11 is provided by threaded arm 68 engaged with internal threads in pivot pin shank 69 and in adapter 70 extending out the rear portion of cylinder 11. Horizontal floor plate 20 is bolted to the floor 22 or other frame member of the vehicle so as to provide a rigid connection to the towed vehicle. FIG. 1 shows bolts or machine screws 23 passing through plate 20, carpet 21, and floor or frame 22 of the towed vehicle. It may be appreciated that when the system of this invention is not needed to be in operational arrangement, container 10 and cylinder 11 may be removed completely with very little effort. Alternatively, container 10 may be removed and cylinder 11 pivoted to lie on the floor. In each instance, of course, the clamp members 13 and 14 must also be disconnected so that the brakes may be operated By the driver of the towed vehicle.

Figure 3:
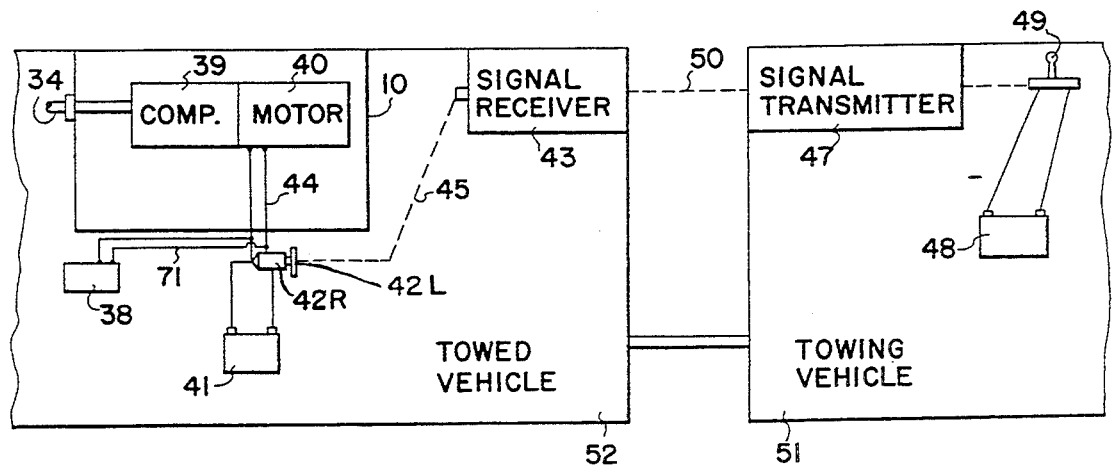
FIG. 3 is a schematic illustration of the electrical circuits involved in the towed and towing vehicles employing the system of this invention.

FIG. 3 shows how the system of this invention is operated when the towing vehicle 51 is being driven with the towed vehicle 52 being pulled along behind. Compressor container 10 containing compressor 39 and its driving motor 40, cylinder 11, and solenoid valve 38 are in place in towed vehicle as shown in FIG. 1. The battery 41 of towed vehicle 52 is hooked up to motor 40 through cigarette lighter 42L and cigarette lighter receptacle 42R which functions as a connection to turn current on or off to motor 40 and solenoid 38. In towing vehicle 51 there is a toggle switch 49 powered by battery 48 of the towing vehicle 51. Switch 49 is connected to a signal transmitter 47 which sends signals to signal receiver 43 in towed vehicle 52. Signal receiver transmits the received signal to cigarette lighter 42 by wire 45, and to solenoid valve 38 by wire 44. The signal 50 may be an electric current or a radio signal. In the former case, there is am electric wire suspended between vehicles 51 and 52; and in the latter case there is no physical connection between the vehicles to carry the signal. Signal 45, is an electric current carried through wires. In either case, the signal promoted by turning toggle switch 49 to the on position causes cigarette lighter connection 42R and 42L to allow the current to pass through, which turns on motor 40 and valve 38 through lines 44 and 71, respectively, energized by the power of battery 41. When toggle switch 49 is turned to the off position the signal through wires 44 and 45 turns off valve 38 and motor 40.

Solenoid valve 38 preferably is a 3-way, valve having one closed port connected to cylinder 11 through line 35, an open exhaust port 46, and a third port 30 which is plugged to a permanently closed position. When solenoid valve 38 is turned on, it closes the exhaust port 46 and opens the port to line 35, thus causing air pressure to be developed by compressor 39 for transmission through line 34 to cylinder 11. When solenoid valve 38 is turned off, exhaust port 46 is opened and the port to line 35 is closed, allowing compressed air to blow out to the surrounding atmosphere. Relief valve 67 is adjustable to any selected maximum pressure and will blow open when pressure above the selected maximum is developed. The selected pressure is such that it will apply the brakes firmly to slow down the towed vehicle without locking the wheels to cause the towed vehicle to slide.

The operation of the system of this invention is controlled entirely by the driver of the towing vehicle when all components are in operating positions shown in FIG. 1. When additional braking power above and beyond that of the towing vehicle is desired the driver moves toggle switch 49 to the on position. This immediately starts compressor 39 to develop compressed air. Solenoid 38 is activated to close exhaust port to allow compressed air to be developed and admitted to cylinder 11 which pushes the piston rod and arm 18 outwardly to depress brake pedal 12. When there is no longer any need for the assistance of the brakes of towed vehicle 52, the toggle switch 49 is turned off which releases all compressed air in cylinder 11, in compressor 39, and in connecting lines to be exhausted to the atmosphere through port 46, and turns off compressor 39. The force applied to brake pedal can be controlled by setting relief valve 67 to any desired level. There is, of course, some small delay from the time toggle switch is turned on to the application of any significant force is applied to brake pedal 12. This merely means that some anticipation for the need of braking assistance must be expected.

Figure 4:
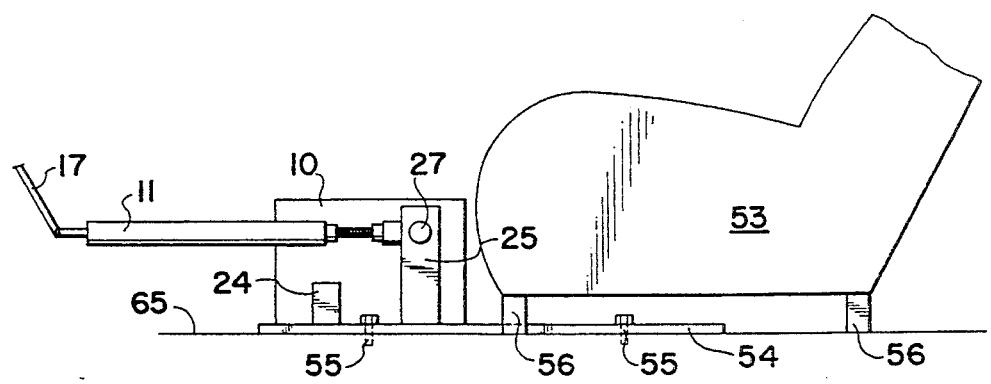
FIG. 4 is a schematic side elevational view of a second embodiment for mounting the system of this invention.
Figure 5:
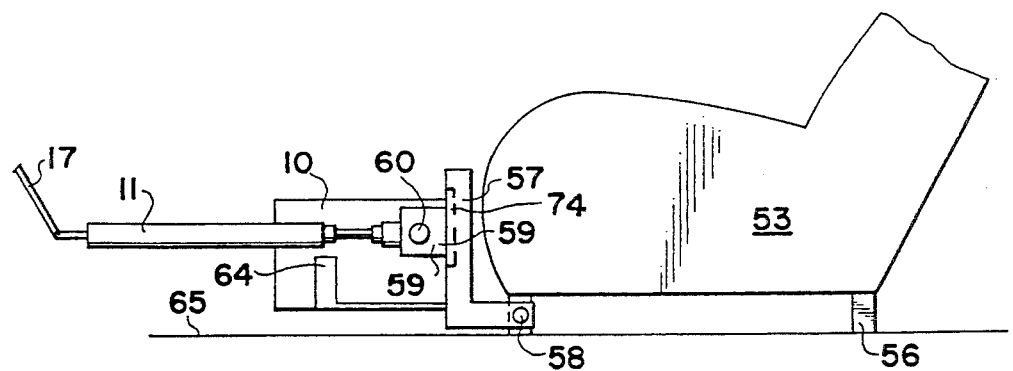
FIG. 5 is a schematic side elevational view of a third embodiment for mounting the system of this invention.
Figure 6:
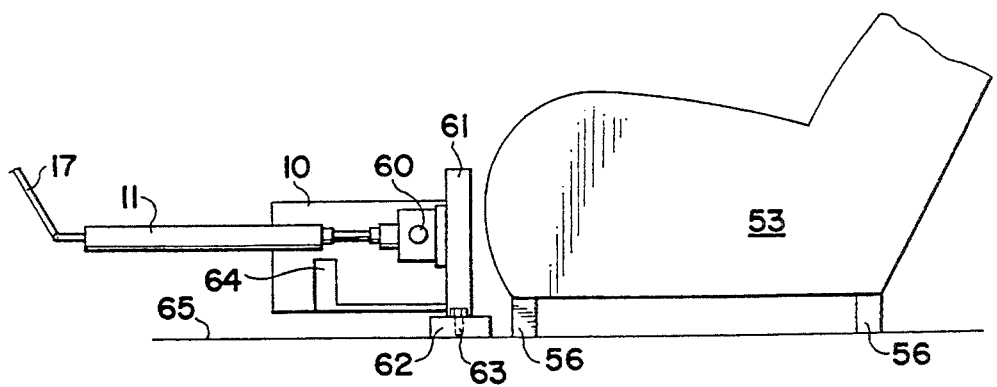
FIG. 6 is a schematic side elevational view of a fourth embodiment for mounting the system of this invention.

In FIGS. 4-6 there are shown three additional arrangements for supporting compressor container 10, cylinder 11, and the associated equipment employed to depress brake pedal 12. In FIG. 4 there is an extended horizontal floor plate 54 which extends to an end under the driver's seat 53 and is bolted or screwed to the floor or frame 65 of the towed vehicle by means of bolts or screws 55. Vertical support plate 25 and pin 27 are employed to support cylinder 11. This arrangement is similar to that of FIGS. 1-2 except that it does not fold to lie on the floor; container 10 and cylinder 11 are disconnected and removed when towed vehicle 52 is driven. In FIG. 5 a supporting structure including two L-beams 57 is employed. L-beams are rigidly attached, respectively, to the two front seat 53 legs 56. A horizontal beam or a vertical plate 74 is fastened to L-beams 57 across the front of seat 53. Container 10, cylinder 11, and associated equipment are fastened to the connecting beam or plate. Preferably there is included a yoke member 59 and a pivot pin to connect to the rear of cylinder 11 and provide it with some vertical pivoting movement so as to facilitate attachment of the piston rod to the brake pedal. The arrangement of FIG. 6 is similar to that of FIG. 5 except that the attachment of the support plate 61 is to the floor 65 through floor plate 62 rather than to the seat legs 56. Yoke member 59 supporting pin 60 is attached to support plate 61. In each arrangement of FIGS. 4–6 there is a saddle member 24 or 64 to hold container 10. Each supporting structure is designed to permit a rapid manual assembly of the braking system for towing; and also a rapid manual disassembly of the braking.

While this invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A system for actuating brakes of a towed vehicle having a driver's seat and a brake pedal by electric signal from the towing vehicle having an electric battery, which comprises a pneumatic cylinder with a movable piston and a piston rod connected directly to the brake pedal of the towed vehicle and adapted to depress the brake pedal when pneumatic pressure is applied to the piston; a portable air compressor removably installable in said towed vehicle and manually connectible via conduits to said cylinder; a solenoid valve means adapted to selectively permit the buildup of compressed air from said compressor to said cylinder or to discharge said compressed air to the surrounding atmosphere; an adjustable relief valve to automatically relieve the development of higher pressures by said compressor than selected; an electric switch means in said towing vehicle to activate said compressor and said solenoid valve means; and electric battery means in said towed vehicle to provide power for said compressor and said solenoid valve means.

2. The system of claim 1 which additionally includes a cigarette lighter means in said towed vehicle adapted to function as an on and off connection in an electric circuit which provides power to operate the compressor from the battery of the towed vehicle.

3. The system of claim 1 wherein said solenoid valve means, when activated, closes a conduit which normally permits compressed air to be discharged to the surrounding atmosphere.

4. The system of claim 1 wherein said signal is transmitted from said towing vehicle to said towed vehicle by closing an electric circuit including the battery of said towing vehicle, a toggle switch in said towing vehicle, said compressor, and said solenoid valve means.

5. The system of claim 4 wherein said circuit includes an electric conductor wire suspended between said two vehicles.

6. The system of claim 4 wherein said circuit includes a radio signal from a transmitter in said towing vehicle to a receiver in said towed vehicle.

7. The system of claim 1 which additionally includes a rigid support structure to which said compressor, said cylinder, and said solenoid valve means are affixed; and means for detachably attaching said support structure to the frame of said towed vehicle.

8. The system of claim 7 wherein said support structure is a vertical plate hingedly attached to a horizontal plate attached to the floor of the towed vehicle.

9. The system of claims 7 wherein said support structure is a horizontal plate which extends under the driver's seat of said towed vehicle and is rigidly affixed to the floor of said towed vehicle.

10. The system of claim 7 wherein said support structure includes a horizontal beam spaced above the floor of said towed vehicle and rigidly attached to the structure connecting the driver's seat to the frame of said towed vehicle.

11. The system of claim 7 wherein said support structure includes a horizontal beam spaced above the floor of said towed vehicle and rigidly attached to the floor of said towed vehicle via two spaced L-beams.

12. The system of claim 7 wherein the rear of said cylinder is pivotally attached to said support structure so as to provide some vertical movement to said piston rod and some lengthwise extension adjustment to said piston rod.

13. A remote control system for actuating brakes of a towed vehicle by an electric signal from a towing vehicle, comprising an electric motor driving a compressor, both being selectively installable and removable from said towed vehicle, a cylinder with a movable piston supported by a piston rod adapted to be directly connected to a brake pedal of said towed vehicle and to depress same when pneumatic pressure is applied to said cylinder to move said piston rod and piston, at least one conduit connected between said compressor and said cylinder to supply pneumatic pressure thereto, a solenoid valve means adapted to selectively permit buildup of compressed air from said compressor to said cylinder or to discharge said compressed air to surrounding atmosphere, an adjustable relief valve pneumatically connected between said compressor and said cylinder to automatically relieve development of higher pressures by said compressor than selected, and an electric switch means adapted to be positioned in said towing vehicle to activate said motor and said solenoid valve means by said electric signal.

14. The remote control system of claim 13 wherein said solenoid valve means, when activated, closes a port which normally permits compressed air to be discharged to surrounding atmosphere.

15. The remote control system of claim 13 further comprising a cigarette lighter means adapted to be inserted into a cigarette lighter receptacle in said towed vehicle to provide on and off connection for electric power to operate said motor from a battery in said towed vehicle.

16. The remote control system of claim 15 wherein said electric signal is transmitted from said towing vehicle to said towed vehicle by closing said electric switch means adapted to be connected to said battery of said towing vehicle, said electric switch means including a toggle switch, said motor being energized by said battery in said towed vehicle upon reception of said electric signal from said towing vehicle.

17. The system of claim 16 wherein said electric signal is transmitted via an electric conductor wire suspended between said towing and towed vehicles.

18. The system of claim 16 wherein said electric signal is transmitted via a radio signal from a transmitter adapted to be in said towing vehicle to a receiver adapted to be in said towed vehicle.

* * * * *